United States Patent
Bocharov et al.

(10) Patent No.: US 10,242,321 B2
(45) Date of Patent: Mar. 26, 2019

(54) EFFICIENT SYNTHESIS OF REPEAT-UNTIL-SUCCESS CIRCUITS IN CLIFFORD + T BASIS

(71) Applicant: Microsoft Technology Licensing, LLC, Redmond, WA (US)

(72) Inventors: Alexei Bocharov, Redmond, WA (US); Krysta M. Svore, Seattle, WA (US); Martin Roetteler, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/302,887

(22) PCT Filed: Apr. 1, 2015

(86) PCT No.: PCT/US2015/023757
§ 371 (c)(1),
(2) Date: Oct. 7, 2016

(87) PCT Pub. No.: WO2015/157049
PCT Pub. Date: Oct. 15, 2015

(65) Prior Publication Data
US 2017/0032272 A1 Feb. 2, 2017

Related U.S. Application Data

(60) Provisional application No. 61/977,570, filed on Apr. 9, 2014.

(51) Int. Cl.
*H03K 19/195* (2006.01)
*G06N 99/00* (2019.01)
(Continued)

(52) U.S. Cl.
CPC ........... *G06N 99/002* (2013.01); *G06F 17/16* (2013.01); *B82Y 10/00* (2013.01)

(58) Field of Classification Search
CPC ........ B82Y 10/00; G06F 17/16; G06N 99/002
(Continued)

(56) References Cited

U.S. PATENT DOCUMENTS

| 2011/0047201 A1 | 2/2011 | Macready et al. |
| 2014/0026107 A1 | 1/2014 | Bocharov et al. |

(Continued)

FOREIGN PATENT DOCUMENTS

CN 103577385 A 2/2014

OTHER PUBLICATIONS

Bocharov et al., "A Depth-Optimal Canonical Form for Single-Qubit Quantum Circuits," available at: http://research.microsoft.com/pubs/170764/1206.3223.pdf, 10 pages (Jun. 14, 2012).
(Continued)

*Primary Examiner* — Don Le
(74) *Attorney, Agent, or Firm* — Klarquist Sparkman, LLP

(57) ABSTRACT

Repeat-Until-Success (RUS) circuits are compiled in a Clifford+T basis by selecting a suitable cyclotomic integer approximation of a target rotation so that the rotation is approximated within a predetermined precision. The cyclotomic integer approximation is randomly modified until a modified value can be expanded into a single-qubit unitary matrix by solving one or more norm equations. The matrix is then expanded into a two-qubit unitary matrix of special form, which is then decomposed into an optimal two-qubit Clifford+T circuit. A two-qubit RUS circuit using a primary qubit and an ancillary qubit is then obtained based on the latter decomposition. An alternate embodiment is disclosed that keeps the total T-depth of the derived circuit small using at most 3 additional ancilla qubits. Arbitrary unitary matrices defined over the cyclotomic field of 8th roots of unity are implemented with RUS circuits.

20 Claims, 10 Drawing Sheets

(51) Int. Cl.
 G06F 17/16 (2006.01)
 B82Y 10/00 (2011.01)
(58) Field of Classification Search
 USPC .......................................................... 326/1
 See application file for complete search history.

(56) References Cited

U.S. PATENT DOCUMENTS

| | | |
|---|---|---|
| 2014/0264288 A1 | 9/2014 | Svore et al. |
| 2014/0280427 A1 | 9/2014 | Bocharov et al. |
| 2015/0106418 A1 | 4/2015 | Kliuchnikov et al. |
| 2017/0220948 A1* | 8/2017 | Bocharov .............. G06N 7/005 |

OTHER PUBLICATIONS

Bocharov et al., "Efficient Decomposition of Single-Qubit Gates into V Basis Circuits," available at: http://arxiv.org/pdf/1303.1411. pdf, 13 pages (Mar. 6, 2013).
Giles et al., "Exact synthesis of multiqubit Clifford+T circuits," available at: http://arxiv.org/pdf/1212.0506v3.pdf, pp. 1-7 (Apr. 2, 2013).
Halil-Shah et al., "A Minimum Control Ancilla Driven Quantum Computation Scheme with Repeat-Until-Success Style Gate Generation," available at: http://arxiv.org/pdf/1401.8004.pdf, 6 pages (Jan. 30, 2014).
Halil-Shah et al., "Ancilla Driven Quantum Computation with Arbitrary Entangling Strength," *8th Conference on the Theory of Quantum Computation, Communication and Cryptography*, 19 pages (Mar. 8, 2013).
International Search Report and Written Opinion from International Patent Application No. PCT/US2015/023757, dated Nov. 11, 2015, 12 pages.
Kliuchnikov et al., "Fast and Efficient Exact Synthesis of Single-Qubit Unitaries Generated by Clifford and T Gates," *Journal of Quantum Information and Computation*, 13, 23 pages (Mar. 1, 2013).
Kliuchnikov et al., "Practical approximation of single-qubit unitaries by single-qubit quantum Clifford and T circuits," available at: http://arxiv.org/pdf/1212.6964v1.pdf, 9 pages (Jan. 1, 2013).
Kliuchnikov et al., "Practical approximation of single-qubit unitaries by single-qubit quantum Clifford and T circuits," available at: http://arxiv.org/pdf/1212.6964v2.pdf, pp. 1-11 (Mar. 13, 2014).
Lim et al., "Repeat-Until-Success Quantum Computing," available at: http://arxiv.org/pdf/quant-ph/0408043v4.pdf, 5 pages (Feb. 1, 2008).
Paetznick et al., "Repeat-Until-Success: Non-Deterministic Decomposition of Single-Qubit Unitaries," *Proceedings of Quantum Physics*, pp. 1-24 (Nov. 6, 2013).
Ross et al., "Optimal ancilla-free Clifford +T approximation of z-rotations," available at: http://arxiv.org/pdf/1403.2975v1.pdf, pp. 1-36 (Mar. 12, 2014).
Selinger, "Efficient Clifford+T approximation of single-qubit operators," available at: http://arxiv.org/pdf/1212.6253v1.pdf, pp. 1-16 (Dec. 26, 2012).
Wiebe et al., "Floating Point Representations in Quantum Circuit Synthesis," *New Journal of Physics*, 15, 3 pages (Sep. 2013).
Wiebe et al., "Floating Point Representations in Quantum Circuit Synthesis," *New Journal of Physics*, 15:1-24 (Sep. 2013).
"Office Action Issued in European Patent Application No. 15716361. 9", dated Mar. 23, 2018, 8 Pages.
"User's Guide to PARI/GP," available at: http://parisnath.ubordeaux. fr/pub/pari/nnanuals/2.5.1/users.pdf, 277 pages. (Aug. 28, 2014).
Office Action and Search Report from Chinese Patent Application No. 201580018860.0, dated May 3, 2018, 13 pages. (with English translation).
Bertok, "PSLQ Integer Relation Algorithm Implementation," available at: http://library.wolfrann.com/infocenter/TechNotes/4263/, 1 page (Aug. 28, 2014).
Bocharov et al., "Efficient Synthesis of Probabilistic Quantum Circuits with Fallback," available at: http://arxiv.org/pdf/1409. 3552v2, 18 pages (Sep. 19, 2014).
Bocharov et al., "Efficient Synthesis of Universal Repeat-Until-Success Circuits," available at: http://arxiv.org/pdf/1404.5320v1, 16 pages. (Apr. 21, 2014).
Bravyi et al., "Magic state distillation with low overhead," available at: http://arxiv.org/pdf/1209.2426v1, 11 pages. (Sep. 11, 2012).
Ferguson, et al., "A Polynomial Time, Numerically Stable Integer Relation Algorithm," RNR Technical Report, 14 pages. (Jul. 14, 1992).
Giles, "Exact Synthesis of Quantum Circuits," available at: http://www.nnta.ca/~gcruttwell/FMCS2013Slides/brettGiles.pdf, 24 pages. (Jun. 1, 2013).
Giles et al., "Remarks on Matsumoto and Amano's normal form for single-qubit Clifford+T operators," available at: http://arxiv.org/pdf/ 1312.6584v1, 13 pages. (Dec. 23, 2013).
Gingrich et al., "Non-Unitary Probabilistic Quantum Computing," Proceedings of the Winter International Symposium on Information and Communication Technologies, 6 pages. (Jan. 5, 2004).
Kliuchnikov et al., "Asymptotically optimal approximation of single qubit unitaries by Clifford and T circuits using a constant number of ancillary qubits," available at: https://arxiv.org/pdf/1212.0822v2, 5 pages. (Dec. 6, 2012).
Kliuchnikov, "Synthesis of Unitaries with Clifford+T circuits," available at: http://arxiv.org/pdf/1306.3200v1, 4 pages. (Jun. 13, 2013).
Massey et al., "Evolving Quantum Circuits and Programs through Genetic Programming," Proceedings of Genetic and Evolutionary Computation Conference, 12 pages. (Jun. 24, 2004).
Massey, "Searching for Quantum Software," Ph.D. Thesis, University of York, Department of Computer Science, 171 pages. (Aug. 2006).
Matsumoto et al., "Representation of Quantum Circuits with Clifford and $\pi/8$ gates," available at: https://arxiv.org/pdf/0806.3834, 2 pages. (Jun. 24, 2008).
Wiebe et al., "Quantum arithmetic and numerical analysis using Repeat-Until-Success circuits," available at: http://arxiv.org/pdf/ 1406.2040v2, 32 pages. (Jun. 19, 2014).
Nielsen et al., "Quantum Computation and Quantum Information," available at: https://cds.cern.ch/record/465953/files/0521635039_ TOC.pdf, 698 pages. (Dec. 9, 2000).
Paler et al., "Software-based Pauli Tracking in Fault-tolerant Quantum Circuit," IEEE Conference and Exhibition on Design, Automation Test, 4 pages. (Mar. 24, 2014).
International Search Report and Written Opinion from PCT Application No. PCT/US2015/049534, dated Feb. 3, 2016, 13 pages.
Written Opinion of the International Preliminary Examining Authority from PCT Application No. PCT/US2015/049534, dated Jul. 29, 2016, 8 pages.
Roetteler, "Quantum Algorithms I, New circuit synthesis methods," available at: http://www.uoguelph.ca/quigs/cssqi14/Slides/Roetteler_ 1.pdf, 64 pages. (Jun. 20,2014).
Shende et al., "Synthesis of quantum logic circuits," available at: http://arxiv.org/pdf/0406176v5, 19 pages. (Apr. 18, 2006).
Terashima et al., "Nonunitary quantum circuit," available at: http://arxiv.org/pdf/0304061v5, 19 pages. (Apr. 6, 2005).
Meier et al., "Magic-state distillation with the four-qubit code," available at: http://arxiv.org/pdf/1204.4221v1, 10 pages, (Apr. 18, 2012).
Non-final Office Action from U.S. Appl. No. 15/510,668, dated Nov. 28, 2018, 14 pages.
Second Office Action from Chinese Patent Application No. 201580018860.0, dated Nov. 8, 2018, 7 pages. (with English translation).

* cited by examiner

EFFICIENT SYNTHESIS OF REPEAT-UNTIL-SUCCESS CIRCUITS IN CLIFFORD + T BASIS

CROSS REFERENCE TO RELATED APPLICATIONS

This is the U.S. National Stage of International Application No. PCT/US2015/023757, filed Apr. 1, 2015, which was published in English under PCT Article 21(2), which in turn claims the benefit of U.S. Provisional Application No. 61/977,570, filed Apr. 9, 2014. The provisional application is incorporated herein in its entirety.

FIELD

The disclosure pertains to decomposition of quantum circuits in a Clifford+T basis.

BACKGROUND

One objective of compilation systems for quantum computing is the decomposition of any required single-qubit unitary operation into sets of gates that can implement arbitrary single-qubit unitary operations. Typically, gate sets that provide fault tolerance are preferred. One gate set that has been identified is referred to as the {H,T} gate set that includes the Hadamard gate and the T-gate. This gate set is universal for single-qubit unitaries (can realize arbitrary single-qubit unitary operations to required precision) and is fault tolerant.

The {H,T} gate set has been used to implement circuits, but historically resulting circuits had excessive cost. Significant progress has been made in the last two years in reducing the cost, but there is ample room for improvement. It has been shown that adding ancillary qubit(s), a two-qubit gate (for example, CNOT or CZ), and measurement operations to the gate set can result in lower cost computation. One approach is based on so-called Repeat-Until-Success (RUS) circuits in which an intended output state can be identified using a measurement of an ancillary qubit and a sequence of Clifford+T gates, where the Clifford+T gate set includes the two-qubit CNOT gate (or CZ gate), the Hadamard gate, and the T-gate. Paetznick and Svore, "Repeat-Until-Success: Non-deterministic decomposition of single-qubit unitaries," available at http://arxiv.org/abs/1311.1074, describe methods for implementing rotations using the Clifford+T gates in combination with measurements and classical feedback. The RUS method achieves superior computation cost. However, these methods are based on an exhaustive search and require exponential runtime. Thus, these methods are limited in achievable precision and hence in applicability.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods and apparatus are disclosed that permit decomposition of quantum computational circuits such as rotation gates into series of Clifford+T gates using one or more ancillary qubits. Typically, a single-qubit unitary is obtained by finding a cyclotomic integer z such that z*/z is rational and corresponds to the selected rotation within a desired precision. The cyclotomic integer z is then modified so as to solve a norm equation, and the modified or scaled value of z is used to define the single-qubit unitary in the Clifford+T basis. This intermediate single-qubit unitary is then expanded into a larger two-qubit unitary which serves as the basis of the circuit design. A Clifford+T decomposition of this two-qubit unitary is arranged as a Repeat-Until-Success (RUS) circuit in which a state associated with an ancillary qubit is measured to determine if the intended circuit operation has been realized on a primary qubit. If not, the primary qubit is restored to an initial state, and RUS circuit operations are repeated.

The foregoing and other features, and advantages of the invention will become more apparent from the following detailed description, which proceeds with reference to the accompanying figures.

DETAILED DESCRIPTION

Figure 1:
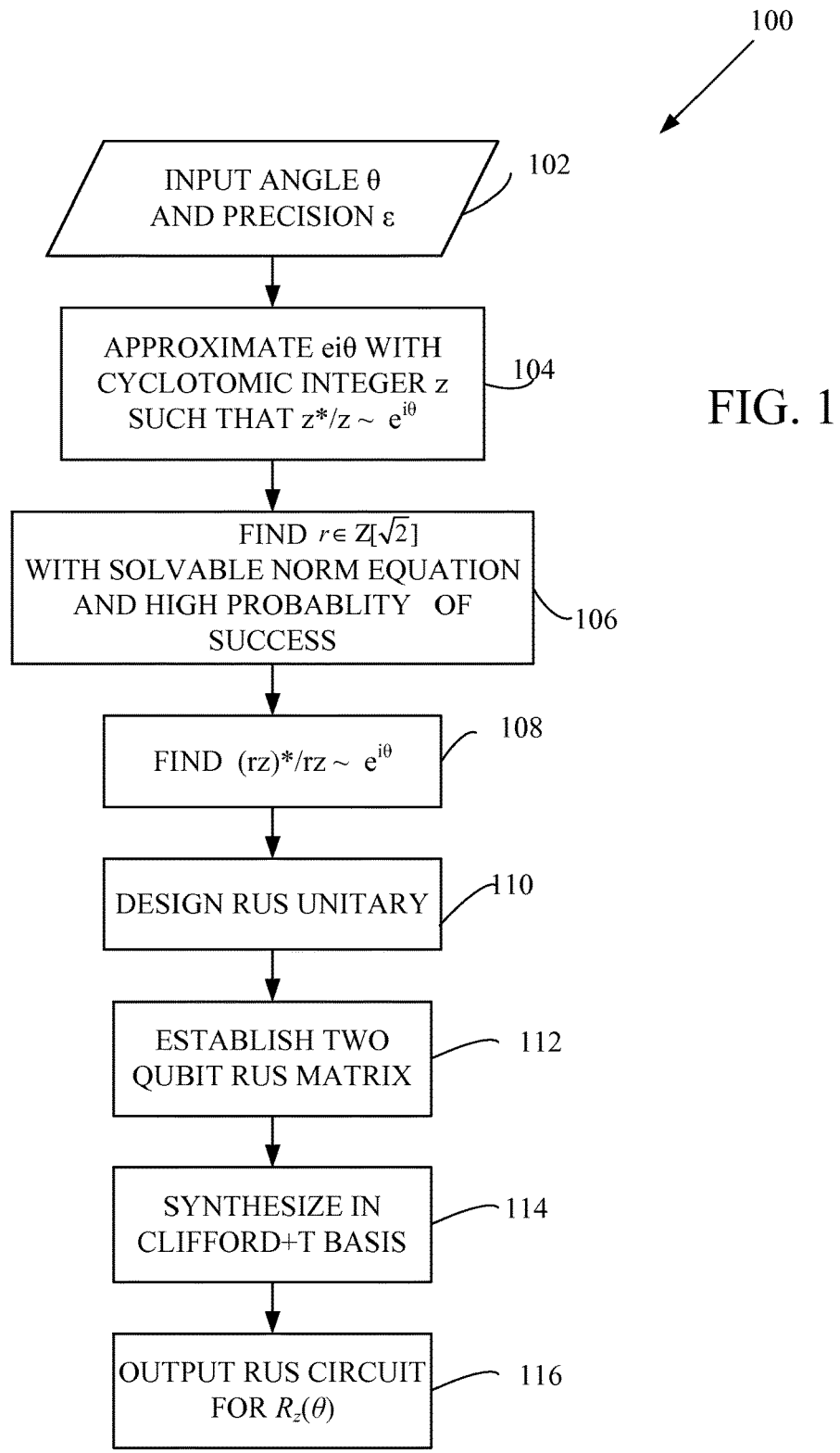
FIG. 1 is a block diagram of a compilation method that synthesizes a repeat-until-success (RUS) circuit over a Clifford+T basis for implementing an axial rotation $R_z(\theta)$ to a precision $\varepsilon > 0$.

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved.

Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or apparatus' are referred to as "lowest", "best", "minimum," or the like. It will be appreciated that such descriptions are intended to indicate that a selection among many used functional alternatives can be made, and such selections need not be better, smaller, or otherwise preferable to other selections.

In some examples, the terms "unitary" or "unitary matrix" are used to refer to functions performed by quantum circuits that can be implemented in a variety of ways. In the following description, such matrices are also referred to as circuits for convenient description. Some commonly used quantum gates corresponding to single-qubit operators S, X, Y, and Z can be represented as:

$$S = \begin{bmatrix} 1 & 0 \\ 0 & i \end{bmatrix}$$

$$X = \begin{bmatrix} 0 & 1 \\ 1 & 0 \end{bmatrix},$$

$$Y = \begin{bmatrix} 0 & -i \\ i & 0 \end{bmatrix},$$

$$Z = \begin{bmatrix} 1 & 0 \\ 0 & -1 \end{bmatrix}.$$

Compilation of high-level quantum algorithms into lower-level fault-tolerant circuits is a critical component of quantum computation. One fault-tolerant universal quantum basis, referred to as the Clifford+T basis, consists of the two-qubit Controlled-NOT gate (CNOT), and two single-qubit gates, the Hadamard gate (H) and the T-gate T. The operation of these gates can be written as:

$$CNOT = \begin{pmatrix} 1 & 0 & 0 & 0 \\ 0 & 1 & 0 & 0 \\ 0 & 0 & 0 & 1 \\ 0 & 0 & 1 & 0 \end{pmatrix}$$

$$H = \frac{1}{\sqrt{2}} \begin{bmatrix} 1 & 1 \\ 1 & -1 \end{bmatrix}, \text{ and}$$

$$T = \begin{bmatrix} 1 & 0 \\ 0 & e^{i\frac{\pi}{4}} \end{bmatrix}.$$

These circuits can be combined to implement an arbitrary unitary operation. A one-qubit unitary operator can be expressed as a unitary 2×2 matrix with complex elements:

$$\begin{bmatrix} a & b \\ -b^* & a^* \end{bmatrix},$$

wherein a and b are complex numbers and the notation "x*" indicates a complex conjugate of x. Such a unitary 2×2 matrix U has the following property:

$$U^\dagger U = UU^\dagger = I = \begin{bmatrix} 1 & 0 \\ 0 & 1 \end{bmatrix},$$

wherein $$U^\dagger = \begin{bmatrix} a^* & -b \\ b^* & a \end{bmatrix}.$$

The adjoint $U^\dagger$ of a unitary matrix U is the complex-conjugate transpose of the unitary U and is the inverse of U, denoted $U^{-1}$.

While circuits can be compiled using the Clifford+T basis, compilation using conventional techniques as in Paetznick and Svore can require exhaustive searches and exponential classical runtimes. Alternative compilation methods, apparatus, and associated circuits based on the Clifford+T basis are disclosed herein. In typical examples described below, a few ancillary qubits and a few measurement operations are used along with purely unitary circuits.

A unitary operation is representable by a Clifford+T circuit if and only if the unitary operation is represented by a unitary matrix of the form $1/\sqrt{2}^k U$ where U is a matrix with elements from $\square[\omega]$ and k is a non-negative integer. $\square[\omega]$ is a ring of cyclotomic integers of order 8, and consists of all numbers of the form $a\omega^3+b\omega^2+c\omega+d$ wherein a, b, c, d are arbitrary integers and $\omega=e^{i\pi/4}$. One choice for a basis of $\square[\omega]$ is $\{\omega^3,\omega^2,\omega,1\}$. To be unitary, $UU^\dagger=2^k$ Id, where Id is an identity matrix. A matrix of such form can be represented as an asymptotically optimal Clifford+T circuit using at most two ancillary qubits. In other representations, no ancillary qubits are required for a single-qubit subject unitary or when $Det(1/\sqrt{2}^k U)=1$. Any single-qubit circuit in the {H,T} basis can be expressed as a sequence of syllables of the form $T^{-k}HT^k$, $k\in\square$ and at most one additional single-qubit Clifford gate. Any single-qubit unitary operation U can be decomposed into a sequence of axial rotations $U=R_z(\alpha) R_x(\beta) R_z(\gamma)$ in accordance with the Euler angle decomposition of U. Thus any single-qubit unitary operation can be decomposed using the techniques presented herein.

T-gates are much harder to perform in a fault-tolerant manner than any of the Clifford gates. In most architectures, a T-gate requires a so-called fault-tolerant "magic state" which is more than an order of magnitude harder to distill for typical quantum error correcting codes than a fault-tolerant Hadamard gate H. The T-gate can be up to two orders of magnitude harder to perform than a CNOT gate or any of the Pauli gates. Accordingly, a cost measure for a Clifford+T circuit (a T-count) is a number of T-gates in a circuit and this cost measure in used in the following description.

With reference to FIG. 1, a compilation method 100 is provided that synthesizes a repeat-until-success (RUS) circuit over a Clifford+T basis for implementing an axial rotation $R_z(\theta)$ to a precision $\varepsilon>0$. At 102, a rotation angle and a precision are selected. At 104, a phase factor $e^{i\theta}$ is approximated with a unimodal cyclotomic rational, i.e., with an algebraic number of the form $z^*/z$ wherein $z \in \Box[\omega]$. A suitable approximation procedure based on solving an integer relation problem is discussed below. The value of z is defined up to an arbitrary real-valued factor. In general, a selected z-value may not be includable in a unitary matrix of the form $$\frac{1}{\sqrt{2}^L}\begin{pmatrix} z & y \\ -y^* & z^* \end{pmatrix}$$

that is exactly representable in the Clifford+T basis.

At 106, several rounds of random modification $z \mapsto (rz)$, $r \in \Box[\sqrt{2}]$ are performed in search of r such that (a) the norm equation $|y|^2 2^L - |rz|^2$ is solvable for $y \in \Box[\omega], L \in \Box$ and (b) the one-round success probability $|rz|^2/2^L$ is sufficiently close to 1. Suitable procedures are described below. At 108, the value of z is modified and at 110, a corresponding one-qubit circuit is defined. At 112, a two-qubit RUS matrix based on the one-qubit circuit is defined. At 114, a desired two-qubit RUS circuit in the Clifford+T basis is synthesized that implements the $R_z(\theta)$ rotation on success and an easily correctable Clifford gate on failure. While a Clifford gate based circuit is convenient for implementation of a correction operation, a correction circuit can include T-gates as well. At 116, a circuit specification for the rotation $R_z(\theta)$ is output. Example implementations of these steps are described in further detail below.

Cyclotomic Rational Approximation

As shown in FIG. 1, at 104, an initial approximation of $e^{i\theta}$ is obtained such that $z^*/z \Box e^{i\theta}$, wherein z is a cyclotomic integer. For a selected real $\theta$ and a cyclotomic integer $z = a\omega^3 + b\omega^2 + c\omega + d$, $a,b,c,d \in \Box$, $|z^*/z - e^{i\theta}| \leq \varepsilon$ if and only if: $|a(\cos(\theta/2) - \sin(\theta/2)) + b\sqrt{2} \cos(\theta/2) + c(\cos(\theta/2) + \sin(\theta/2)) + d\sqrt{2} \sin(\theta/2)| < \varepsilon|z|$. Thus $e^{i\theta}$ is representable exactly only if $\varepsilon|z| = 0$. If $\varepsilon|z|$ is small, then $|z^*/z - e^{i\theta}|$ is small as well. An integer relation algorithm can be used to find a relation between a set of real numbers and a candidate vector defined by a set of integers $a_1, \ldots, a_n$, not all zero, such that:

$$a_1 x_1 + \ldots + a_n x_n = 0.$$

Most commonly an integer relation algorithm makes iterative attempts to find an integer relation until the size of the candidate vector $a_1, \ldots, a_n$ exceeds a certain pre-set bound or $a_1 x_1 + \ldots + a_n x_n$ falls below a selected resolution level. Such an algorithm can be used to reduce the size of $a_1 x_1 + \ldots + a_n x_n$ to an arbitrarily small value.

In one example, a so-called PSLQ relation algorithm is used to find an integer relation between $(\cos(\theta/2) - \sin(\theta/2), \sqrt{2} \cos(\theta/2), (\cos(\theta/2) + \sin(\theta/2)), \sqrt{2} \sin(\theta/2)$ and terminates if and only if $|z^*/z - e^{i\theta}| < \varepsilon$. (The PSLQ algorithm is described in, for example, Helaman R. P. Ferguson and David H. Bailey, "A Polynomial Time, Numerically Stable Integer Relation Algorithm," RNR Technical Report RNR-91-032 (Jul. 14, 1992), which is incorporated herein by reference.) Upon termination, the algorithm also provides the integer relation candidate vector $\{a, b, c, d\}$ for which the integer relation is satisfied. Then, $z = a\omega^3 + b\omega^2 + c\omega + d$ is the desired cyclotomic integer.

Lifting Phase Approximation to a Unitary: Randomized Search

Upon finding a cyclotomic integer z, the value of z is to be included in a unitary matrix of the form:

$$\frac{1}{\sqrt{2}^L}\begin{pmatrix} z & y \\ -y^* & z^* \end{pmatrix},$$

wherein $y \in \Box[\omega], L \in \Box$. In addition, reasonably large values of $|z|^2/2^L$ are associated with one-round success probability of an eventual RUS circuit and are thus preferred. It is not clear that a particular value of z can be included in a unitary matrix such as shown above. A value of $y \in \Box[\omega]$ is needed that satisfies a norm equation $(|y|^2 + |z|^2)/2^L = 1$, or, alternatively $|y|^2 = 2^L - |z|^2$.

To solve the above norm equation, it is convenient to note that the cyclotomic integer z obtained from a cyclotomic rational approximation of $e^{i\theta}$ is not unique, but is defined up to an arbitrary real-valued factor $r \in \Box[\sqrt{2}]$. For any such r, $(rz)^*/(rz)$ is identical to $z^*/z$ but the norm equation $|y|^2 = 2^L - |rz|^2$ can change dramatically. Thus, if suitable values of r are reasonably dense in $\Box[\sqrt{2}]$, random values of r can be selected until the norm equation $|y|^2 = 2^L - |rz|^2$ is solvable. Selection of a particular value of y (and a particular unitary matrix) can be based on a ratio of circuit complexity (for example, T-count) and a probability of circuit success, wherein the probability of circuit success can be expressed as $p(r) = |rz|^2/2^L$. Thus, a suitable value of r can be found and the value of z modified so that $(rz)^*/(rz) \Box e^{i\theta}$. With this modification of z, a y value can be obtained by solving the norm equation, and a single-qubit unitary defined.

Figure 2:
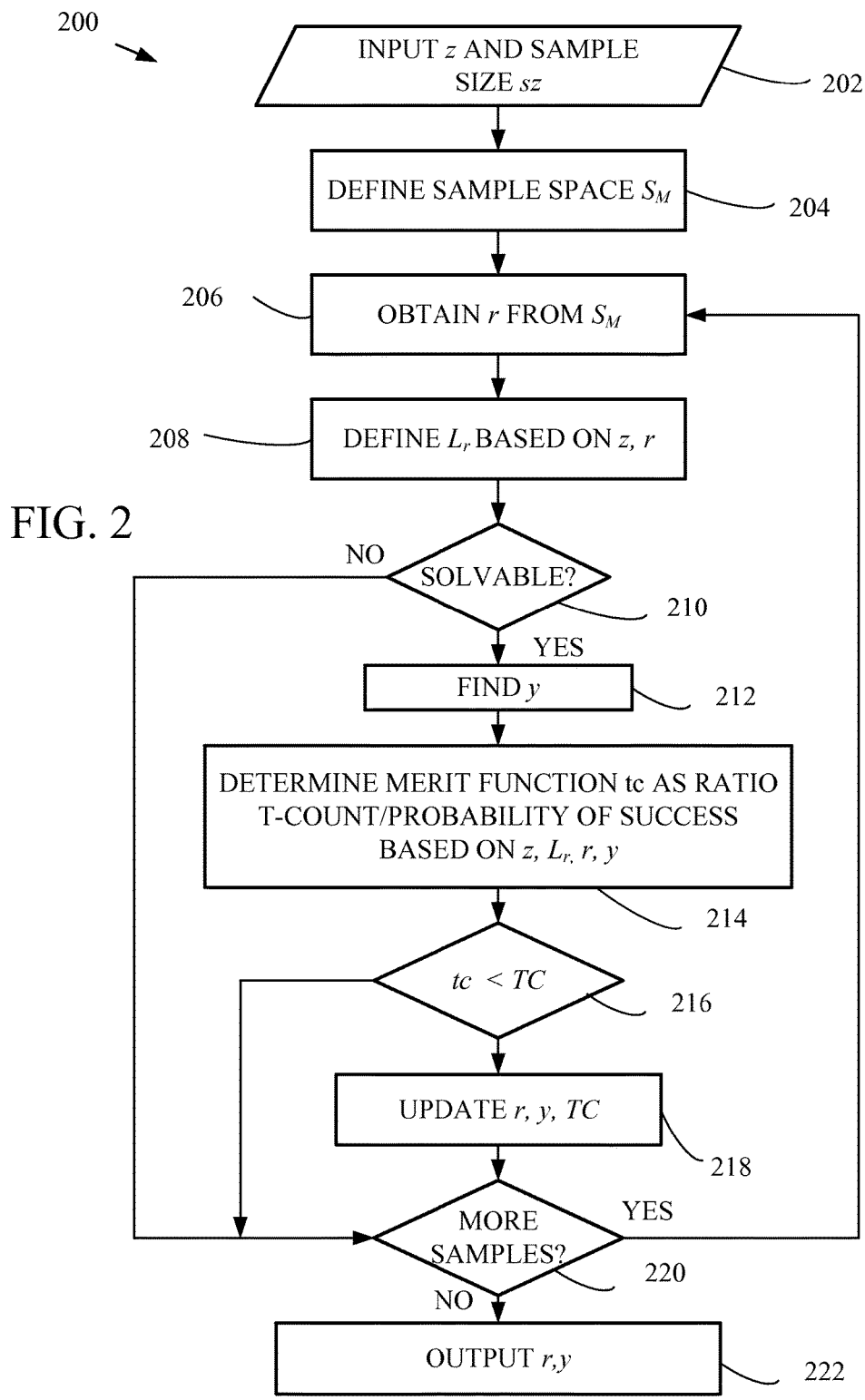
FIG. 2 illustrates a random search method for obtaining values for a single-qubit unitary matrix.

Referring to FIG. 2, a method 200 of defining a unitary includes receiving a cyclotomic integer $z = a\omega^3 + b\omega^2 + c\omega + d$ such that $z^*/z \Box e^{i\theta}$ and receiving a number sz of samples of r to be evaluated at 202. At 204, a sample space $S_M$ from which r-values are to be randomly selected is defined as $S_M \leftarrow \{a + b\sqrt{2}, a, b \in \Box | 0 < a^2 + b^2 < M^2\}$, wherein M is a sampling radius. Sample spaces of other shapes can be used, but a sampling radius M is convenient. At 206, a value of r is randomly selected without replacement from the sample space $S_M$, and at 208 an associated value of L is determined as $L_r \leftarrow j \log_2(|rz|^2)k$, wherein j f k is a ceiling function having a value equal to the smallest integer that is greater than f. At 210, the norm equation $|y|^2 = 2^{L_r} - |rz|^2$ is evaluated to determine if it is easily solvable for the selected value of r. If the norm equation is not easily solvable, the method 200 determines if additional samples are to be evaluated at 220. If easily solvable, a value of y is obtained at 212 and a merit function is evaluated at 214 to determine if this value of y is preferable to previously obtained values. A representative merit function tc is a ratio of circuit T-count to probability of success p, i.e., $$tc \leftarrow Tcount\left[\frac{1}{\sqrt{2}^{L_r}}\begin{pmatrix} z & y \\ -y^* & z^* \end{pmatrix}\right]/p.$$

Upon computation of the merit function tc at 214, the computed value is compared with a value associated with a previous estimate of y at 216. If the value of the merit function is less than that associated with the previous estimate, stored values of r and y and the associated merit function value are updated at 218. It is then determined if additional samples of r are to be tried at 220. If the merit function found to have not been decreased at 216, then it is determined if additional samples of r are to be tried at 220 as well. If so additional samples are to be evaluated, an additional random value of r is obtained at 206 and the processing steps are repeated with this value of r. Otherwise, values of r and y are output at 222. In some instances, no suitable values of r are found, and the lack of suitable values is output instead at 222. Generally, if no values are found (i.e., Y=none), the procedure is repeated by reducing the value of precision by, for example, reducing the value by a factor of 2.

A particular merit function is used in the example of FIG. 2 and is based on a function:

$$Tcount = Tcount\left[\frac{1}{\sqrt{2}^{L_r}}\begin{pmatrix} z & y \\ -y^* & z^* \end{pmatrix}\right].$$

Methods of determination and/or estimation of a number of T-gates (i.e., circuit T-count) for a unitary as shown above are well known. However, other types of merit functions can be used based on one or more of T-count, success probability, or other factors. The T-count function is described in, for example, Bocharov and Svore, "A Depth-Optimal Canonical Form for Single-Qubit Quantum Circuits," available at http://arxiv.org/abs/1206.3223, and Gossett et al., "An algorithm for the T-count," available at http://arxiv.org/abs/1308.4134. Methods similar to the method of FIG. 2 are shown in greater detail in the pseudo-code for the procedures RAND-NORMALIZATION of Tables 1-2 below.

TABLE 1

Random Normalization (z, sz, M)
Input: z ∈ $\mathbb{Z}$[w], sample size sz, M

```
1: procedure RAND-NORMALIZATION(z, sz, M)
2:    cnt ← 0, Y ← None, Tc ← ∞
3:    S_M ← {a + b √2, a, b ∈ Z|0 < a² + b² < M²}
4:    while (cnt ++) ≤ sz do
5:       Sample r without replacement from S_M
6:       L_r ← ⌈log₂(|r z|²)⌉
7:       if |y|² = 2^{L_r} − |r z|² is easily solvable then
8:          p ← |r z|²/2^{L_r}
9:          tc ← Tcount( (1/√2^{L_r}) ( z  y ; −y*  z* ) )/p
10:         if tc < Tc then
11:            Tc ← tc, Y ← {r, y}
12:         end if
13:      end if
14:   end while
15: end procedure
```

An alternative procedure is shown in Table 2 below. In this alternative procedure, a minimum success probability $p_{min}$ is input along with a selected value of z and a sample radius M. The function card($S_M$) is the cardinality of the set $S_M$.

TABLE 2

Random Normalization (z, $p_{min}$, M)
Input: z ∈ $\mathbb{Z}$[ω], minimum success probability $p_{min}$, M

```
1: procedure RAND-NORMALIZATION(z, p_min, M)
2:    cnt ← 0, Y ← None, Tc ← ∞
3:    S_M ← {a + b √2, a, b ∈ Z|0 < a² + b² < M²}
4:    while (cnt ++) ≤ card(S_M) do
5:       Sample r without replacement from S_M
6:       L_r ← ⌈log₂(|r z|²)⌉
7:       if |y|² = 2^{L_r} − |r z|² is easily solvable then
8:          p ← |r z|²/2^{L_r}
9:          tc ← Tcount( (1/√2^{L_r}) ( z  y ; −y*  z* ) )/p
10:         if p > p_min and tc < Tc then
11:            Tc ← tc, Y ← {r, y}
12:         end if
```

TABLE 2-continued

Random Normalization (z, $p_{min}$, M)
Input: z ∈ $\mathbb{Z}$[ω], minimum success probability $p_{min}$, M

```
13:      end if
14:   end while
15: end procedure
```

Single-Qubit Circuit Synthesis

Figure 3:
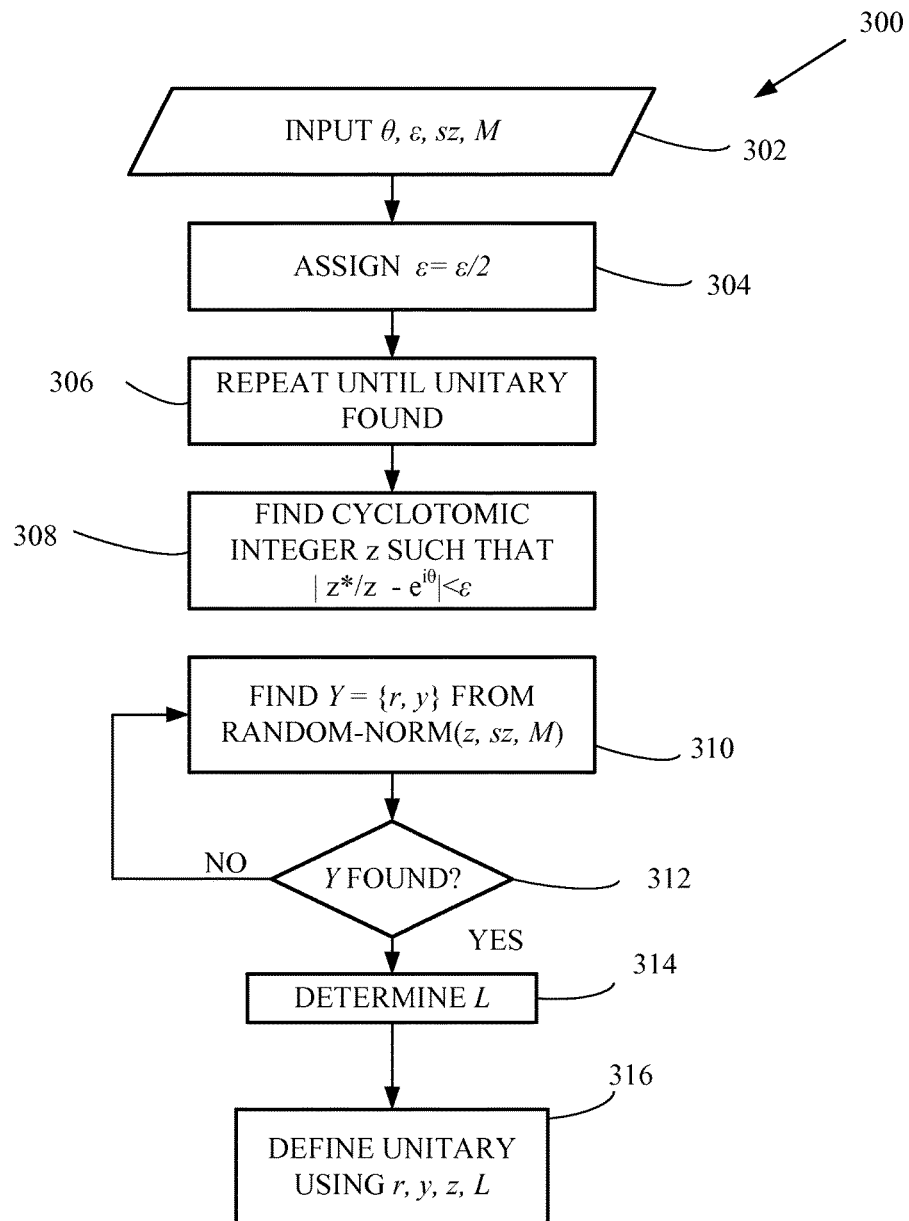
FIG. 3 illustrates a method of obtaining a unitary matrix implementable in a Clifford+T basis.

FIG. 3 illustrates a method 300 of defining a single-qubit circuit based on a selected rotation angle θ, a precision ε, a number of iterations sz, and a sampling radius M that are input at 302. At 304, a value of the precision is re-assigned, and at 306 a procedure for finding parameters for the corresponding unitary matrix is initiated. At 308, a suitable cyclotomic integer is found, and at 310 a random search/norm equation solution procedure such as those of Tables 1-2 is implemented. If a suitable value of Y={r,y} is found, a value of L is computed at 314, and the required unitary matrix is defined at 316. Pseudocode for such a method is shown in Table 3 below.

TABLE 3

Single-Qubit Circuit Determination
Input: angle θ, target precision ε, sample size sz, hyperparameter M

```
1: procedure SINGLE-QUBIT-DESIGN(θ, ε, sz)
2:    ret ← None, ∈ ← 2ε
3:    while ret = None do
4:       ∈ ← ∈/2
5:       Compute z ∈ Z[ω] s.t. |z*/z − e^{iθ}| < ∈
6:       Y ← RAND − NORMALIZATION(z, sz)
7:       if Y ≠ None then
8:          r ← first(Y); y ← last(Y)
9:          L ← log₂(|rz|² + |y|²)
10:         ret ← (1/√2^L) ( rz  y ; −y*  rz* )
11:      end if
12:   end while
13: end procedure
```

Repeat-Until-Success Unitary Circuit Synthesis

With the above methods, a single-qubit unitary matrix for the rotation R(θ) in the Clifford+T basis is found of the form:

$$V = \frac{1}{\sqrt{2}^L}\begin{pmatrix} z & y \\ -y^* & z^* \end{pmatrix},$$

wherein y, z∈□(ω),L∈□. The unitary matrix V can be represented as an ancilla-free circuit in the single-qubit Clifford+T basis using a procedure described by Kliuchnikov et al., "Fast and efficient exact synthesis of single qubit unitaries generated by Clifford and T gates," arXiv: 12065236v4 (Feb. 27, 2013), which is incorporated herein by reference. The unitary matrix V can be decomposed by other methods as well. To find a two-qubit (RUS) circuit (i.e., with an ancilla), define a two-qubit unitary $$U = \begin{pmatrix} V & 0 \\ 0 & V^\dagger \end{pmatrix}.$$

This two-qubit unitary can be incorporated into a RUS circuit with one ancilla so as to perform the rotation $$\begin{pmatrix} 1 & 0 \\ 0 & z^*/z \end{pmatrix}$$

on a primary qubit on success and the Pauli Z operation on failure. The unitary matrix V that is included in U can be incorporated into a two-qubit Repeat-Until-Success (RUS) circuit with one ancillary qubit, such that the circuit performs the rotation $$\begin{pmatrix} 1 & 0 \\ 0 & z^*/z \end{pmatrix}$$

upon success and a Pauli Z operator on failure, wherein $$Z = \begin{pmatrix} 1 & 0 \\ 0 & -1 \end{pmatrix}.$$

For example, for a two-qubit design where qubit 1 is a primary qubit and qubit 2 is an ancillary qubit initialized with $|0\rangle$, if $|\Psi\rangle = a|0\rangle + b|1\rangle$ is the input state on the primary qubit then $U(|\Psi\rangle \otimes |0\rangle)$ is proportional to $za|00\rangle - y^* a|01\rangle + z^*b|10\rangle + y^*b|11\rangle$. Therefore upon measuring the ancillary qubit, if the measurement result is 0, then the output state is equivalent to $a|0\rangle + (z^*/z)b|1\rangle$ (i.e., success) and if the measurement result is 1 then the output state is equivalent to $a|0\rangle - b|1\rangle$ (i.e., failure).

Figure 4:
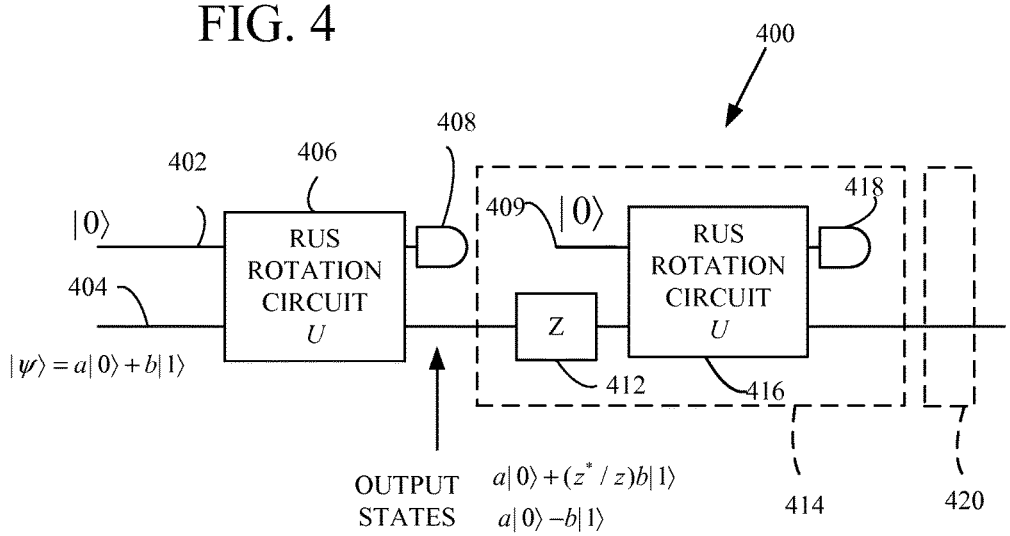
FIG. 4 illustrates a representative RUS circuit.

A representative RUS circuit 400 with an ancillary qubit 402 is illustrated in FIG. 4. The ancillary qubit 402 is initialized in a state $|0\rangle$ and is coupled to an RUS circuit 406 along with a primary qubit 404 in a state $|\Psi\rangle = a|0\rangle + b|1\rangle$. At 408, an output state of the ancillary qubit 408 is measured. If the measurement of the ancillary qubit 402 is 0, the output state of the primary qubit corresponds to $a|0\rangle + (z^*/z)b|1\rangle$ which is associated with the selected rotation (referred to as "success"). If the output state of the ancillary qubit is 1, then the output state of the primary qubit 404 is $a|0\rangle - b|1\rangle$, which does not correspond to the intended rotation operator (referred to as "failure"). In this case, the primary qubit 404 is coupled to a subsequent two-qubit circuit 414 having an ancillary qubit 409 that is initialized to state $|0\rangle$. The primary qubit 404 is coupled to a Z gate 412 that produces a state $|\omega\rangle = a|0\rangle + b|1\rangle$ which is the same as the original input state to the RUS circuit 406 so that the Z gate 412 reverses the operation of the RUS circuit 406. The processing operations of the two-qubit circuit 414 can be repeated until success is achieved. The second RUS circuit 416 provides similar results at the RUS circuit 406 upon measurement at 418. Additional similar stages such as circuit 420 can be provided to increase the likelihood of success.

The two-qubit unitary U can be implemented as a series of Clifford+T gates but implementations in which circuit T-count is the same or only slightly greater than that of the corresponding optimal single qubit circuit are preferred. If V and W are single-qubit unitaries both representable by single-qubit ancilla-free Clifford+T circuits of the same minimal T-count t, then it can be shown that the two-qubit unitary $$U = \begin{pmatrix} V & 0 \\ 0 & W \end{pmatrix}$$

is exactly and constructively representable by a Clifford+T circuit of T-count at most t+9. Generally, given two single-qubit Clifford+T circuits of the same T-count, either can be manufactured from the other by insertion and deletion of Pauli gates, along with the addition of at most two non-Pauli Clifford gates. The latter two gates are responsible for all potential T-count increases while lifting the V,W pair to the desired two-qubit circuit.

For convenience, a T code is defined as a circuit generated by TH and $T^\dagger H$ syllables. If c is a T code then $Hc^{-1}H$ is a T code. A decorated T code is a circuit generated by syllables of the form $PT^{\pm 1}QH$ wherein $P,Q \in \{Id,X,Y,Z\}$, and Id is an identity operator. A decorated T code $c_2$ is referred to as a decoration of a T code $c_1$ if $c_1$ can be obtained from $c_2$ by removing all explicit occurrences of Pauli gates. A single-qubit, ancilla-free Clifford+T circuit can be constructively rewritten in the form $g_1 c g_2$ where c is a T code and $g_1$, $g_2$ are single-qubit Clifford gates.

The following identities can also be useful:
XTH=$T^\dagger$HZ$\omega$
YTH=$T^\dagger$HY$\omega^5$
ZTH=THX
XSHTH=$S^\dagger$HTHX$\omega^2$
YSHTH=$S^\dagger$HT$^\dagger$HY$\omega^3$
ZSHTH=SHT$^\dagger$HZ$\omega$ Canonical $\langle T, H \rangle$ circuits are defined as circuits representable as arbitrary compositions of TH and HTH syllables, and starting with a TH syllable. For any T code $c_1$ any single-qubit ancilla-free Clifford+T circuit $c_2$ of the same T-count can be constructively rewritten as $g_3 c'_1 g_4$ where $c'_1$ is a decoration of $c_1$ and $g_3$, $g_4$ are Clifford gates. If $c_1$ and $c_2$ are single-qubit Clifford+T circuits of the same T-count t, a T code $c_3$, one of its decorations $c_4$, and Clifford gates $g_1$, $g_2$, $g_3$, $g_4$ can be found such that $c_1 = g_1 c_3 g_2$ and $c_2 = g_3 c_4 g_4$.

A lift procedure is defined that converts a decorated T-code into a two qubit circuit. For any Pauli gate P, Lift(P)=$\Lambda$(P), where $\Lambda$(P) indicates a controlled-P gate. For any other gate g, Lift(g)=Id$\otimes$g. Given a single-qubit Clifford+T circuit $c = g_1 \ldots g_4$ wherein $g_i \in \{X,Y,Z,H,T,T^\dagger\}$ i= 1, . . . , r, Lift(c)=Lift($g_1$) . . . Lift($g_r$). Informally, up to Clifford gate wrappers, any two single-qubit Clifford+T circuits are related via T code decoration.

If a single-qubit unitary U is represented as $Hc_1$ where $c_1$ is a T code of T-count t, then the two-qubit unitary $$\begin{pmatrix} U & 0 \\ 0 & U^\dagger \end{pmatrix}$$

is constructively represented by a two-qubit Clifford+T circuit of T-count of either t or t+1. The unitary matrix $U^\dagger$ can be decomposed into $Hc_2\omega^k$, $k \in \square$ wherein $c_2$ is a decoration of the circuit $c_1$. Since $(Hc_1)^{-1} = (c_1)^{-1}H$ is H followed by a T code, the desired decomposition is Lift(Hc$_2$) (T$^k$⊗Id). The T-count of Lift(Hc$_2$) is t and the T-count of (T$^k$) Id) is either 0 or 1.

More generally, if V,W are single-qubit unitaries both representable by single-qubit ancilla-free Clifford+T circuits of the same minimal T-count t, then a two-qubit unitary $$U = \begin{pmatrix} V & 0 \\ 0 & W \end{pmatrix}$$

is exactly and constructively representable by a Clifford+T circuit of T-count of at most t+9.

The unitary W can be constructively represented as $g_3g_1c'g_2g_4$ wherein c' is a decoration of c, and $g_3$, $g_4$ are Clifford gates. Defining c"=Lift (c'), U can be represented as $\Lambda(g_3)(Id⊗g_1)c''(Id⊗g_2)\Lambda(g_4)$. Each occurrence of a controlled Clifford gate increases the T-count by at most 5. By applying a suitable global phase the T-count of $\Lambda(g_3)$ is at most 4. For any Clifford gate g, the controlled gate $\Lambda(g)$ can be can be represented as a product of Clifford gates and exactly one gate of the form $\Lambda(h)$ wherein h∈{Id,ω$^{-1}$S,H, ω$^{-1}$SH,ω$^{-1}$HS}.

Figure 5:
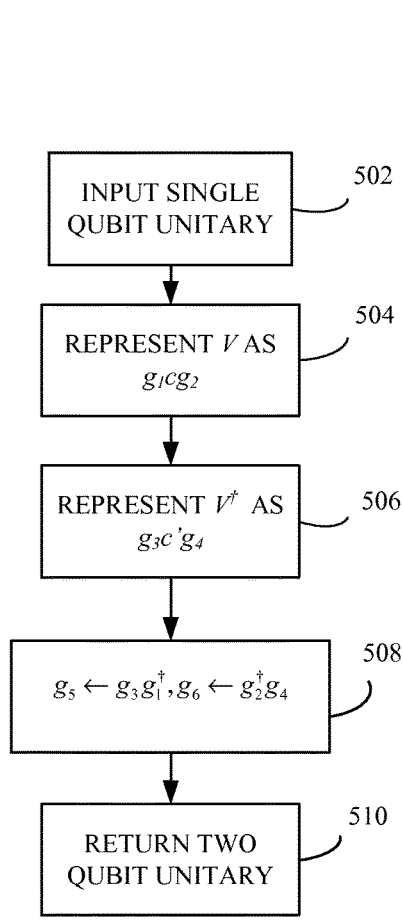
FIG. 5 illustrates a method of obtaining a two-qubit unitary matrix.

A representative method of obtaining a two-qubit unitary based on a single input unitary V is shown in FIG. 5. At 502, a single qubit unitary V is input. At 504, V is represented as a product $g_1cg_2$ and at 506, V$^†$ is represented as a product $g_3c'g_4$, wherein $g_1$, $g_2$, $g_3$, $g_4$ are Clifford gates, c is a T-code, and c' is a decoration of c. At 508, additional Clifford gates are obtained based on the Clifford gates used in the product representations of V and V$^†$. At 510, a suitable two qubit unitary is returned as $\Lambda(g_5)(Id⊗g_1)Lift(c')(Id⊗g_2)\Lambda(g_6)$. Pseudocode for this method is found in Table 3 below.

TABLE 3

Pseudocode for determining a two-qubit unitary with a primary and an ancillary qubit.

Input: single qubit unitary V▷ representable in Clifford+T
1: procedure PARSIMONIOUS-RUS-SYNTHESIS(V)
2:   represent V as $g_1$ c $g_2$ where c is T code▷ g1, g2 are Clifford gates
3:   represent V$^†$ as $g_3$ c' $g_4$ where c' is a decoration of c▷ g3, g4 are Clifford gates
4:   $g_5 ← g_3\ g_1^†$, $g_6 ← g_2^†g_4$
5:   ret ← $\Lambda(g_5)(Id⊗g_1)Lift(c')(Id⊗g_2)\Lambda(g_6)$
6: end procedure
Output: ret Example Determination of a Clifford+T basis RUS circuit for a representative rotation is described below for a target rotation $R_z(\pi/64)$ and a precision of $10^{-11}$. A ratio z*/z is found that approximates $e^{i\pi/64}$. In this example, z=1167ω$^3$=218ω$^2$−798ω−359 and an associated precision is about 3×10$^{-12}$, better than the target precision of 10$^{-11}$. Next, the value of z is modified using a randomized search to find a solvable norm equation so that z=18390ω$^3$−4226ω$^2$−11614ω−1814 and a one round success probability is 0.9885. Circuit synthesis then generates the RUS circuit design $\Lambda(ω^{-1}\ SH)core\Lambda(ω^{-1}SH)$, wherein core=id(/)(T$^{-1}$ H T$^{-1}$ H) CNOT Id ⊗(T$^{-1}$ H T H) CNOT Id⊗(T H T H T$^{31}$ H) CNOT Id ⊗(T$^{-1}$ H) CNOT Id⊗(T$^{-1}$ H) CNOT Id⊗(T$^{-3}$ H) CNOT Id⊗(T$^{-1}$ H) CNOT Id⊗(T H) CNOT Id(/)(T$^{-3}$ H T$^3$ H) CNOT Id⊗(T$^{-1}$ H T$^{-1}$ H T$^{-1}$ H) CNOT Id⊗(T H T H) CNOT Id⊗(T H T$^{-3}$ H) CNOT Id(/)(T$^3$ H) CNOT Id⊗(T$^{-3}$ H) CNOT Id⊗(T H T H) CNOT Id⊗(T$^{-1}$ H) CNOT Id⊗(T H T$^{-1}$ H) CNOT Id⊗(T$^{-1}$ H) CNOT Id⊗(T$^3$ H) CNOT Id⊗(T$^{-1}$ H T$^{-1}$ H) CNOT Id⊗(T H T H) CNOT Id⊗(T$^{-3}$ H T$^3$ H T$^{-1}$ H) CNOT Id⊗(T H T$^{-1}$ H) CNOT Id⊗(T H) CNOT Id⊗(T$^{-1}$ H) CNOT Id⊗(T H) CNOT Id⊗(T$^{-3}$ H) CNOT Id⊗(T H) CNOT T G T$^{-1}$ H T H CNOT Id⊗(T$^{-1}$ H T$^{-1}$ H) CNOT Id⊗(T$^{-3}$ H S$^†$)

The S-gate above corresponds to a square of the T-gate. The $\Lambda(ω^{-1}\ SH)$ operation has a T-count of 4 and the overall cost of the RUS circuit measured in T gates is 58. The expected T-cost is 58/0.9885<58.7. This circuit implements a z-rotation on success and Pauli Z gate operation on failure, which is Pauli-correctable. A final trace distance between $R_z(\pi/64)$ and the rotation implemented by the RUS is 1.056×10$^{-12}$ which is better than the requested precision. Another version of this circuit is $\Lambda(ω^{-2}H)core(Id⊗S)\Lambda(H)$, which has an expected T-cost of 54.6, performs the same z-rotation on success and the phase gate S on failure. Application of the phase gate S is Clifford-correctable.

Figure 6:
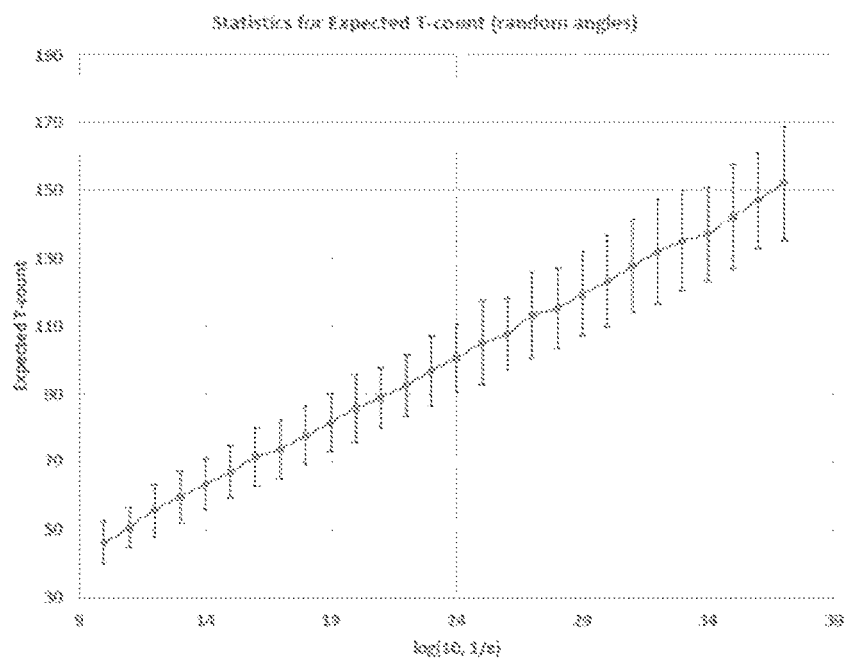
FIG. 6 shows T-count statistics for 1000 target rotation angles randomly selected from the interval $(0, \pi/2)$.
Figure 7:
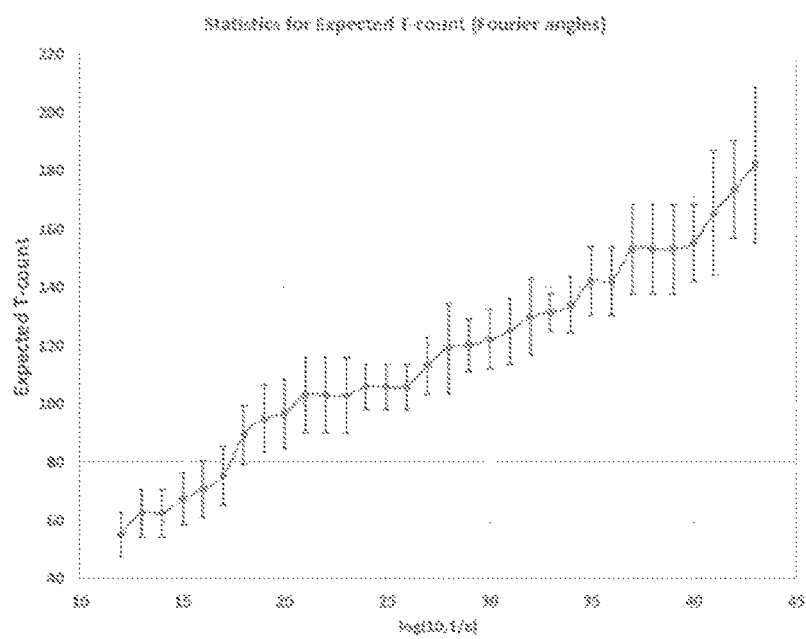
FIG. 7 shows T-count statistics for 40 rotation angles of the form $\pi/2^k$, $k=2, \ldots, 41$.

FIGS. 6-7 show mean and standard deviation across a set of expected T-count values of the RUS circuits generated algorithmically for each target rotation in the second test set for each precision. FIG. 6 shows T-count statistics for 1000 target rotation angles randomly selected from the interval (0,π/2). This set of target axial rotations was evaluated at 25 levels of target precision ε∈{10$^{-11}$, . . . , 10$^{-35}$}. A regression formula for T-count is 3.817 log$_{10}$(1/ε)+9.2=1.149 log$_2$(1/ε)+9.2. FIG. 7 shows T-count statistics for 40 rotation angles of the form π/2$^k$, k=2, . . . , 41. This set of target rotation angles (referred to as Fourier angles) was evaluated at 30 levels of target precision ε∈{10$^{-11}$, . . . , 10$^{-40}$}. A regression formula for T-count is 3.59 log$_{10}$(1/ε)+17.5=1.08 log$_2$(1/ε)+17.5.

n-Qubit RUS Circuits

Figure 8:
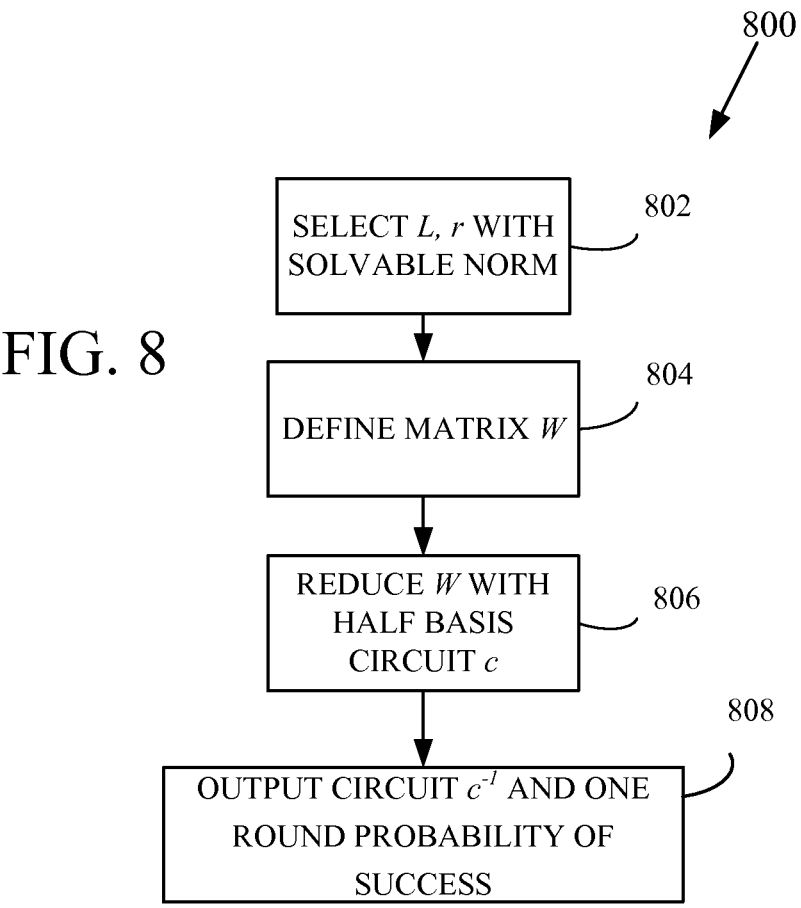
FIG. 8 illustrates a representative method of producing a multiple qubit RUS circuit.

Consider an n-qubit unitary of the form $$\frac{1}{z}V$$

where z∈Z[√i] and V is a 2$^n$×2$^n$ matrix over Z[√i]. This unitary can be implemented by a Clifford+T RUS with at most n+2 qubits. A method 800 for finding such a unitary is shown in FIG. 8. At 802, an integer L and an r∈Z[√2] are selected such that a norm equation |y|$^2$=2$^L$−|rz|$^2$ is solvable for y∈Z[√i]. At 804, a 2$^{n+1}$×2$^n$ matrix $$W = \frac{1}{\sqrt{2}^L}\begin{bmatrix} r & V \\ y & Id \end{bmatrix}$$

is defined which is to be completed to a 2$^{n+1}$×2$^{n+1}$ unitary matrix following a procedure described in Kliuchnikov et al., "Fast and efficient exact synthesis of single qubit unitaries generated by Clifford and T gates," arXiv:12065236v4 (Feb. 27, 2013). At 806 the 2$^n$ columns of the matrix W are reduced to a half-basis by a Clifford+T circuit c that is synthesized using a procedure described in Brett Giles and Peter Selinger, "Exact synthesis of multi-qubit Clifford+T circuits," Phys. Rev. A (2012), such that:

$$cW = \begin{pmatrix} Id_{2^n} \\ 0_{2^n} \end{pmatrix}$$

It follows that $c^{-1}$ evaluates to a $2^{n+1} \times 2^{n+1}$ unitary matrix that complements the half-square matrix W. The circuit $c^{-1}$ can intermittently use an ancillary qubit to perform the two-level primitive unitaries of the T-type. In any case, $c^{-1}$ is the desired RUS circuit and is output at 810. Indeed, $$c^{-1}(|0\rangle \otimes |\psi\rangle) = \left(|0\rangle \otimes \left(\frac{r}{(\sqrt{2})^L} V\right)|\psi\rangle\right) + \left(|1\rangle \otimes \left(\frac{y}{(\sqrt{2})^L} Id\right)|\psi\rangle\right).$$

The target operator $$\frac{1}{z}V$$

is the unitarization of $$\frac{r}{(\sqrt{2})^L} V$$

and the unitarization of $$\frac{y}{(\sqrt{2})^L}$$

Id is Id.
Thus, when the top qubit is measured, $$\frac{1}{z}V$$

is returned for a 0 measurement and Id is returned for a 1 measurement. A one-round success rate for this circuit is $|rz|^2/2^L$, therefore, values of L close to $\lceil \log_2(|rz|^2) \rceil$ are preferred.

Reducing the Number of Entanglers in RUS Designs

RUS circuits synthesized as disclosed herein may include a large number of controlled-Pauli gates. In some cases, an RUS circuit design could contain 2t controlled-Pauli Pauli gates wherein t is the circuit T-count. Although a controlled-Pauli gate has zero T-count, in some examples, it is preferred to reduce the number of controlled-Pauli gates. Up to one half of the Pauli gates in a circuit can be constructively eliminated from a T-odd ⟨T, H, Pauli⟩ circuit using a set of signature-preserving rewrite rules. For a single-qubit Clifford+T circuit of the form $g_0 T^{k_1} g_1, \ldots, T^{k_r} g_r$ where $g_0, g_4$ are Clifford gates and for i=1, . . . , r 1 wherein $g_i \in \{Id, X, Y, Z, H, XH, YH, ZH, HX, HY, HZ\}$, the series of integers $\{k_1, \ldots, k_r\}$ is referred to as a signature of the circuit. A unitary $V^\dagger$ can be represented as a Pauli decoration c' of a circuit c representing V is so that the signatures of c and c' are the same. Only the signature of the Pauli deco-ration circuit is of concern, and any equivalent transformations can be applied to such a decoration as long as those transformations preserve the signature. If the T-count of a decorated T code c is t, then the circuit can be rewritten in a form c'i$^m$, m∈□, wherein c' is an equivalent decorated T code with no more than t+1 Pauli gates and the same signature as c. In some cases, one or more of the following rewrite rules is used:

Y ↦ ω² XZ
XZ ↦ ω⁻²Y
ZX ↦ ω²Y
XX ↦ empty
ZZ ↦ empty
XH ↦ HZ
ZH ↦ HX
ZX ↦ ω⁴ XZ
ZT$^m$ ↦ T$^m$Z Based on the commutation rules XH=HZ; YH=−YH; and ZH=XH, any term of the form PQH, wherein P,Q are Pauli gates can be reduced to H P'i$^m$m∈□, wherein P' is a Pauli gate.

Computing Environments

Figure 9:
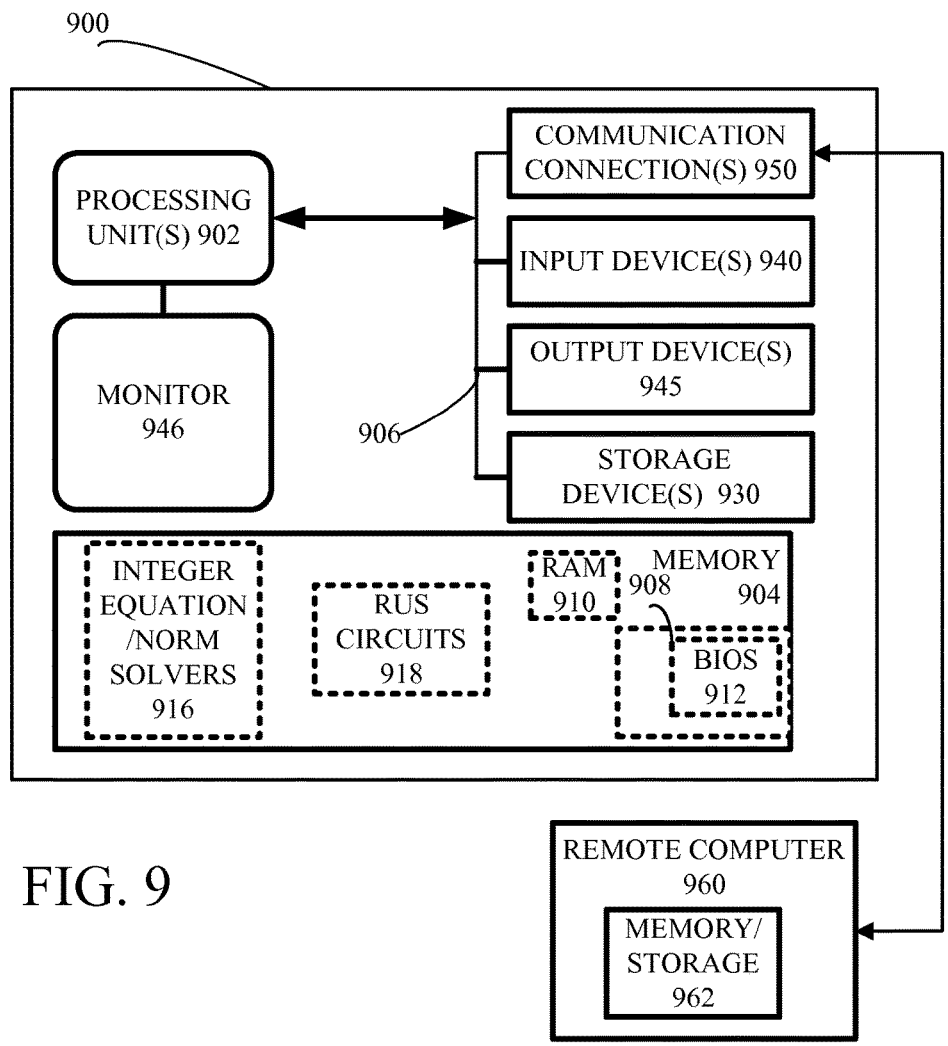
FIG. 9 is a block diagram of a representative computing environment in which the disclosed methods can be implemented.

FIG. 9 and the following discussion are intended to provide a brief, general description of an exemplary computing environment in which the disclosed technology may be implemented. Although not required, the disclosed technology is described in the general context of computer executable instructions, such as program modules, being executed by a personal computer (PC). Generally, program modules include routines, programs, objects, components, data structures, etc., that perform particular tasks or implement particular abstract data types. Moreover, the disclosed technology may be implemented with other computer system configurations, including hand held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 9, an exemplary system for implementing the disclosed technology includes a general purpose computing device in the form of an exemplary conventional PC 900, including one or more processing units 902, a system memory 904, and a system bus 906 that couples various system components including the system memory 904 to the one or more processing units 902. The system bus 906 may be any of several types of bus structures including a memory bus or memory controller, a peripheral bus, and a local bus using any of a variety of bus architectures. The exemplary system memory 904 includes read only memory (ROM) 908 and random access memory (RAM) 910. A basic input/output system (BIOS) 912, containing the basic routines that help with the transfer of information between elements within the PC 900, is stored in ROM 908.

As shown in FIG. 9, computer-executable instructions for RUS synthesis are stored in a memory portion 916 and includes instructions for, for example, solving integer equations, evaluating and solving norm equations, and random sampling for determination of r values. In addition, a memory portion 918 stores RUS circuit definitions obtained using the disclosed methods. Computer-executable instructions are also stored for receiving rotation angles and precisions as well as communicating circuit definitions.

The exemplary PC 900 further includes one or more storage devices 930 such as a hard disk drive for reading from and writing to a hard disk, a magnetic disk drive for reading from or writing to a removable magnetic disk, and an optical disk drive for reading from or writing to a removable optical disk (such as a CD-ROM or other optical media). Such storage devices can be connected to the system bus 906 by a hard disk drive interface, a magnetic disk drive interface, and an optical drive interface, respectively. The drives and their associated computer readable media provide nonvolatile storage of computer-readable instructions, data structures, program modules, and other data for the PC 900. Other types of computer-readable media which can store data that is accessible by a PC, such as magnetic cassettes, flash memory cards, digital video disks, CDs, DVDs, RAMs, ROMs, and the like, may also be used in the exemplary operating environment.

A number of program modules may be stored in the storage devices 930 including an operating system, one or more application programs, other program modules, and program data. Storage of quantum syntheses and instructions for obtaining such syntheses can be stored in the storage devices 930 as well as or in addition to the memory 904. A user may enter commands and information into the PC 900 through one or more input devices 940 such as a keyboard and a pointing device such as a mouse. Other input devices may include a digital camera, microphone, joystick, game pad, satellite dish, scanner, or the like. These and other input devices are often connected to the one or more processing units 902 through a serial port interface that is coupled to the system bus 906, but may be connected by other interfaces such as a parallel port, game port, or universal serial bus (USB). A monitor 946 or other type of display device is also connected to the system bus 906 via an interface, such as a video adapter. Other peripheral output devices, such as speakers and printers (not shown), may be included. In some cases, a user interface is display so that a user can input a circuit for synthesis, and verify successful synthesis.

The PC 900 may operate in a networked environment using logical connections to one or more remote computers, such as a remote computer 960. In some examples, one or more network or communication connections 950 are included. The remote computer 960 may be another PC, a server, a router, a network PC, or a peer device or other common network node, and typically includes many or all of the elements described above relative to the PC 900, although only a memory storage device 962 has been illustrated in FIG. 9. The personal computer 900 and/or the remote computer 960 can be connected to a logical a local area network (LAN) and a wide area network (WAN). Such networking environments are commonplace in offices, enterprise wide computer networks, intranets, and the Internet.

When used in a LAN networking environment, the PC 900 is connected to the LAN through a network interface. When used in a WAN networking environment, the PC 900 typically includes a modem or other means for establishing communications over the WAN, such as the Internet. In a networked environment, program modules depicted relative to the personal computer 900, or portions thereof, may be stored in the remote memory storage device or other locations on the LAN or WAN. The network connections shown are exemplary, and other means of establishing a communications link between the computers may be used.

Figure 10:
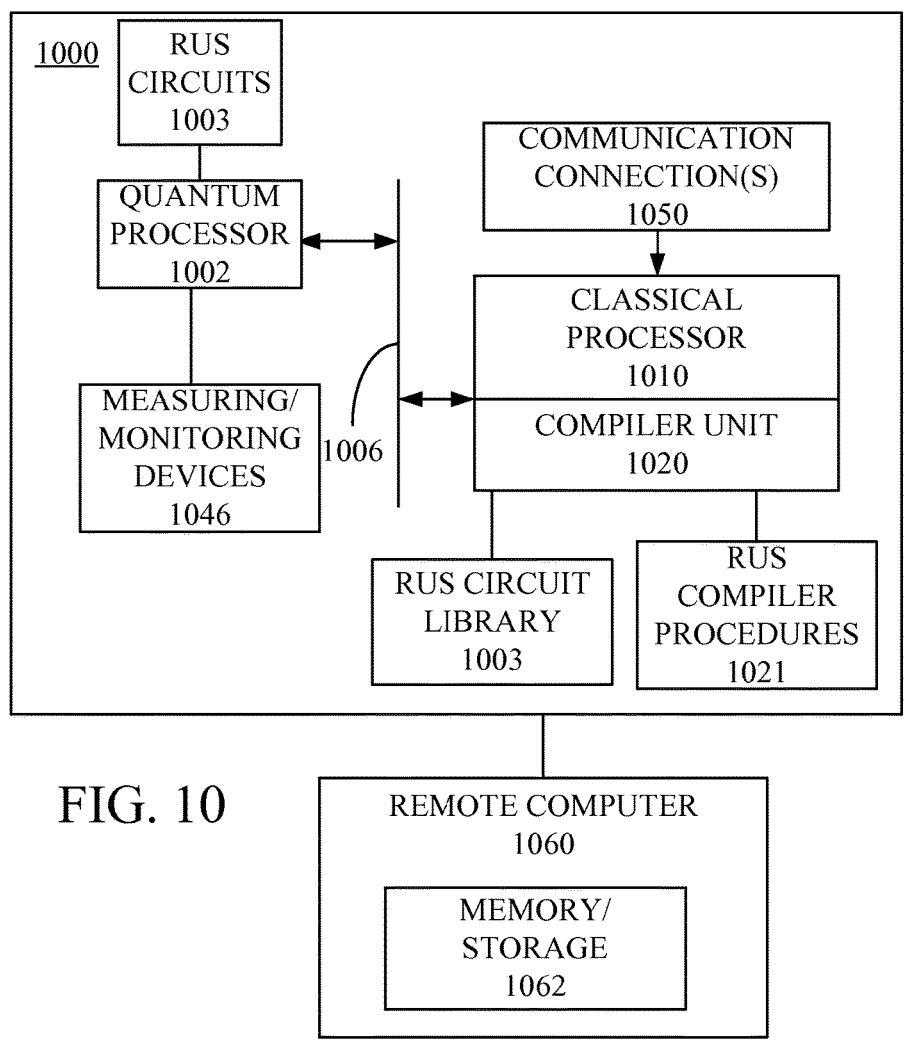
FIG. 10 is a block diagram of a representative computing environment that includes classical and quantum processing.

With reference to FIG. 10, an exemplary system for implementing the disclosed technology includes computing environment 1000, where compilation into braid pattern circuits is separated from the quantum processing that consumes the compiled circuits. The environment includes a quantum processing unit 1002 and one or more monitoring/measuring device(s) 1046. The quantum processor executes quantum circuits that are precompiled by classical compiler unit 1020 utilizing one or more classical processor(s) 1010. The precompiled quantum circuits such as RUS circuits 1003 are downloaded into the quantum processing unit via quantum bus 1006.

With reference to FIG. 10, the compilation is the process of translation of a high-level description of a quantum algorithm into a sequence of quantum circuits. Such high-level description may be stored, as the case may be, on one or more external computer(s) 1060 outside the computing environment 1000 utilizing one or more memory and/or storage device(s) 1062, then downloaded as necessary into the computing environment 1000 via one or more communication connection(s) 1050. Alternatively, the classical compiler unit 1020 is coupled to a classical processor 1010 and an RUS compiler procedure library 1021 that contains some or all procedures necessary to implement the methods described above as well as an RUS circuit library 1003 that stores compiled circuits.

Figure 11:
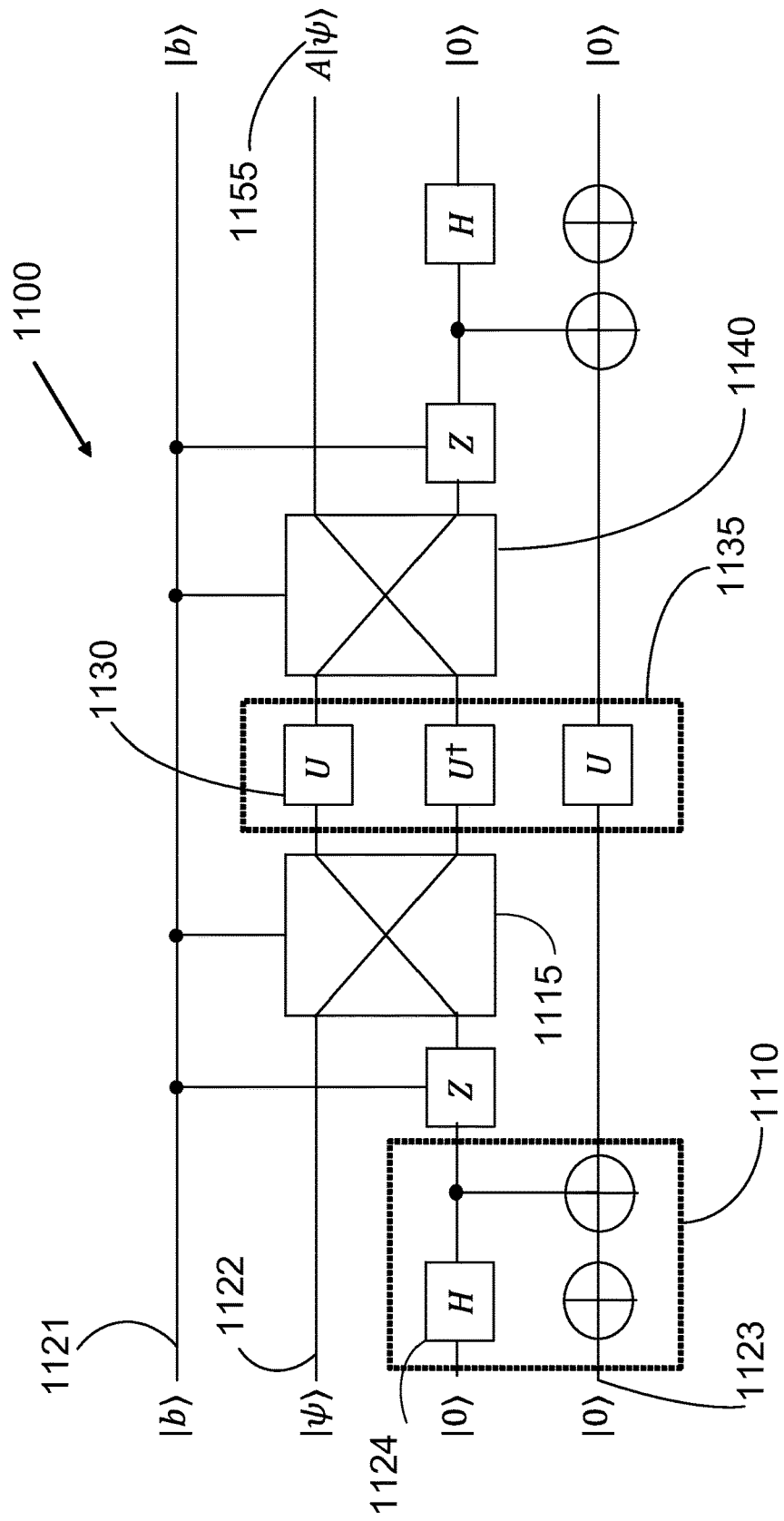
FIG. 11 illustrates a method for implementing RUS circuits using 2 ancillas with total circuit depth equal to the circuit depth of rotation U.

Having described and illustrated the principles of our invention with reference to the illustrated embodiments, it will be recognized that the illustrated embodiments can be modified in arrangement and detail without departing from such principles. For instance, elements of the illustrated embodiment shown in software may be implemented in hardware and vice-versa. Also, the technologies from any example can be combined with the technologies described in any one or more of the other examples. Alternatives specifically addressed in these sections are merely exemplary and do not constitute all possible FIG. 11 illustrates an alternative circuit 1100 that implements a two-qubit unitary transformation of the form $$\begin{pmatrix} U & 0 \\ 0 & U^\dagger \end{pmatrix}$$

wherein U is a single qubit unitary 1130, Depending on a value of a flag bit b (established by a qubit 1121), the circuit 1100 implements a transformation of an input state of a qubit 1122 that is given by either U or $U^\setminus$. The resulting state is obtained at the output 1155, wherein the output state is unentangled with all other qubits. The single-qubit unitary U 1130 is of the form $R_z(\theta)R_x(\beta)R_z(-\theta)$, wherein $\theta$ and $\beta$ are real numbers. The circuit 1100 uses two ancilla qubits 1123, 1124 initialized in 0 states.

The circuit 1100 consists of an initial preparation circuit 1110 that produces an Einstein-Podolsky-Rosen (EPR) state |00>+|11> which is then subjected to quantum routing circuits 1115 and 1140 that permute part of the EPR state and the input state of the qubit 1122 depending on the value of bit b. In a "b=0" branch, the input state of the qubit 1122 undergoes evolution by U and the remaining state |00>+|11> is an eigenstate of eigenvalue 1 of the tensor product operator $U^\setminus$ with U. In a "b=1" branch, the input state of the qubit 1122 undergoes evolution by $U^\setminus$ and the remaining state |00>−|11> is an eigenstate of eigenvalue 1 of the tensor product operator U with U.

The overall effect of the circuit 1100 is to achieve at the output 1155 a transformation of the input that corresponds to U in case b=0 and U^ in case b=1. In either case, the 2 ancilla qubits 1123, 1124 are again returned in the 0 state. As a core circuit 1130 can be executed in parallel, the circuit 1100 has the feature that its overall circuit depth is no larger than the circuit depth of U, except for a constant additive overhead due to the EPR preparation 1110 and computation thereof as well as the routing operations of quantum routing circuits 1115, 1140.

Figure 12:
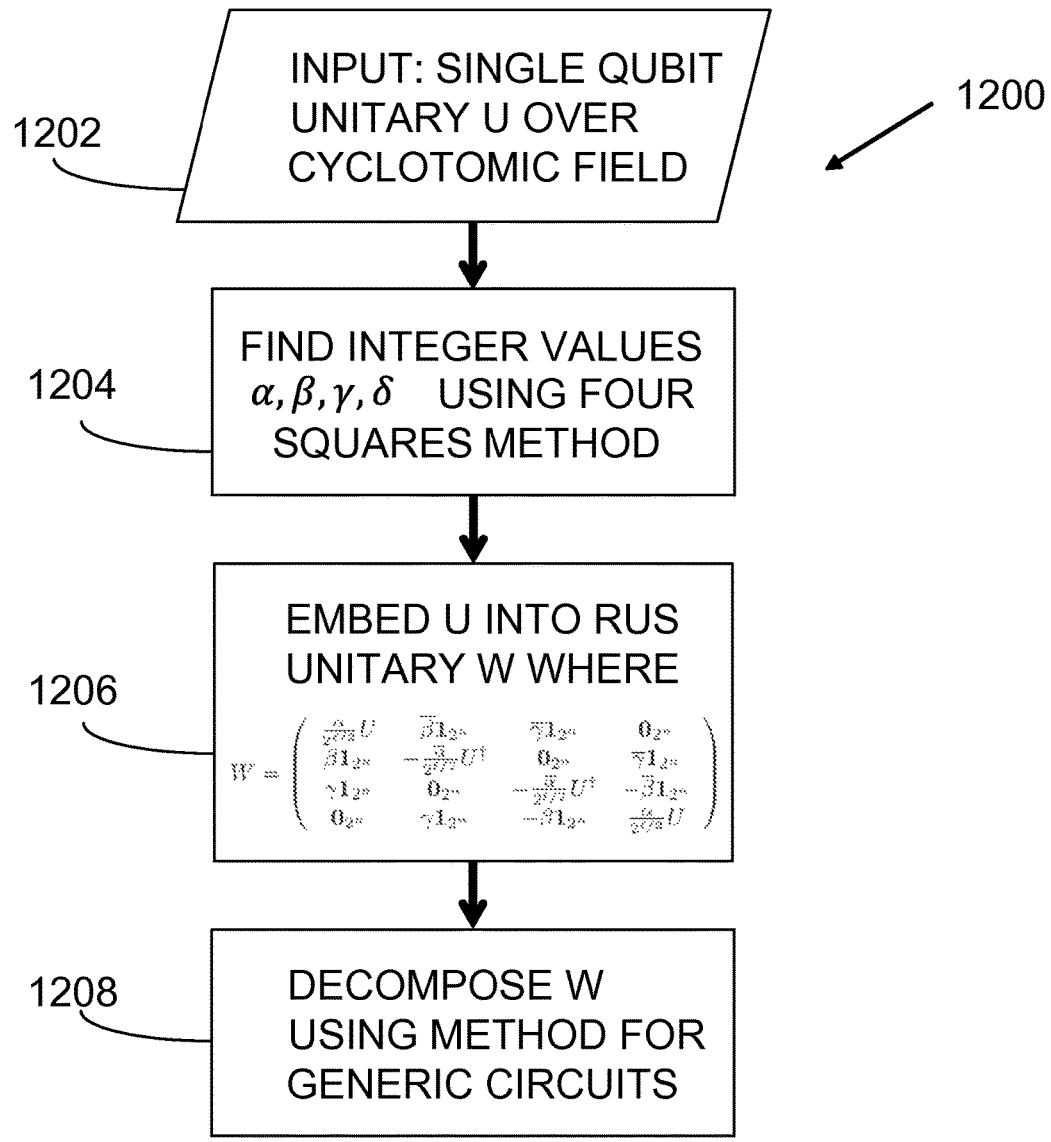
FIG. 12 illustrates a method for implementing arbitrary unitary transformations with coefficients over the field of cyclotomic rationals $Q(\omega)$ using at most 2 ancillas.

With reference to FIG. 12, a circuit decomposition method 1200 for arbitrary unitary transformations over the cyclotomic field $Q(\omega)$ is disclosed that uses at most 2 additional ancilla qubits. At 1202, a unitary is input that can act on one, two, three, or more qubits, and is not limited to acting on a single qubit. At 1206, a selected unitary U is embedded into a unitary W of larger size of the form:

$$W = \begin{pmatrix} \frac{\alpha}{2^{\ell/2}}U & \bar{\beta}1_{2''} & \bar{\gamma}1_{2''} & 0_{2''} \\ \beta 1_{2''} & -\frac{\alpha}{2^{\ell/2}}U^\dagger & 0_{2''} & \bar{\gamma}1_{2''} \\ \gamma 1_{2''} & 0_{2''} & -\frac{\alpha}{2^{\ell/2}}U^\dagger & -\bar{\beta}1_{2''} \\ 0_{2''} & \gamma 1_{2''} & -\beta 1_{2''} & \frac{\alpha}{2^{\ell/2}}U \end{pmatrix}$$

One convenient method of determine integer coefficients $\alpha$, $\beta$, $\gamma$, $\delta$ at 1204 is a method based on a Four Square Decomposition of integers which is applicable for arbitrary matrices U over the cyclotomic field. Alternatively, methods solving norm equations over cyclotomic number fields and subfields can be used, and in some examples, suitable methods are based on particular properties of a selected U. Once the embedding matrix W is obtained at 1206, a Clifford+T factorization is obtained using methods for decomposition of unitary matrices over the ring of integers in $Q(\omega)$ at 1208.

In other examples, quantum circuits are defined by obtaining a four tuple of integers so that a given rotation matrix U over the cyclotomic field can be embedded into a unitary W over the ring of cyclotomic integers. The rotation matrix U is embedded into the unitary W, and W is decomposed using a suitable gate set, such as Clifford+T gates. In some examples, an initial RUS circuit is defined based on a plurality of ancilla qubits, and subsequently re-synthesized so as to be implementable with only 2 ancilla qubits.

In other examples, quantum circuits are defined to include two ancilla qubits and a control qubit so as to implement a RUS matrix for axial rotations with circuit depth equal to the circuit depth of the defining block U, wherein a transformation associated with the RUS matrix is associated with U or U^ based on a value of a control qubit. A controlled routing operation is arranged to couple an input state to a unitary operation implementing either U or U^ and a controlled preparation operation creates one of two available EPR states depending on whether an eigenstate of a tensor product of U with itself or a tensor product of U with its inverse is required. The circuit decomposition of U is lifted to provide a circuit for parallel execution of U and U^ and having the same T-depth as a single application of U.

In some examples, quantum circuits such as two-qubit circuits are based on a plurality of gates selected from the group of Hadamard gates, CNOT gates, and T-gates selected in association with an arbitrary single qubit rotation matrix U, wherein entries of the matrix U are real or complex numbers, and U corresponds to a sequence of axial rotations such that $U=R_z(\alpha)R_x(\beta)R_z(\gamma)$, wherein $R_z$ denotes a rotation about a z-axis and $R_x$ denotes a rotation about an x-axis, wherein $\alpha$, $\beta$, $\gamma$ are Euler angles. Ancillary qubits and a primary qubit are coupled to the plurality of gates such that production of a first output state of the first ancillary qubit is associated with an output state of the primary qubit that is associated with the rotation $R_z(\alpha)$, a second output state of the second ancillary qubit associated with an output state of the primary qubit that is associated with the rotation $R_x(\beta)$ and a third output state of the third ancillary qubit associated with an output state of the primary qubit that is associated with the rotation $R_z(\gamma)$. In some examples, the first ancillary qubit and the primary qubit are reused for production of the rotation $R_x(\beta)$ and at least one of the second and third ancillary qubits and the primary qubit is reused for production of the rotation $R_z(\gamma)$. In other examples, the decomposition of U into a sequence of axial rotations is based on Givens rotations.

Having described and illustrated the principles of the disclosed technology with reference to the illustrated embodiments, it will be recognized that the illustrated embodiments can be modified in arrangement and detail without departing from such principles. For instance, elements of the illustrated embodiments shown in software may be implemented in hardware and vice-versa. Also, the technologies from any example can be combined with the technologies described in any one or more of the other examples. It will be appreciated that procedures and functions such as those described with reference to the illustrated examples can be implemented in a single hardware or software module, or separate modules can be provided. The particular arrangements above are provided for convenient illustration, and other arrangements can be used.

The invention claimed is:

1. A method of defining a quantum circuit, comprising:
establishing a rational cyclotomic approximation of a target single-qubit unitary to a requested precision;
expanding the rational cyclotomic approximation into a multi-qubit unitary that implements the target single-qubit unitary upon successful measurement;
decomposing the multi-qubit unitary into a Clifford+T circuit; and
defining a Repeat-Until-Success (RUS) circuit based on the decomposition.

2. The method of claim 1, further comprising:
establishing the rational cyclotomic approximation of the target single-qubit unitary so as to solve a required norm equation; and
defining the multiple-qubit unitary based on the rational cyclotomic approximation.

3. The method of claim 1, wherein the multi-qubit unitary is a multi-qubit unitary defined with respect to at least one ancillary qubit and a primary qubit.

4. The method of claim 2, wherein the target unitary is an axial rotation and is approximated by $z^*/z$ wherein z is a cyclotomic integer; and
modifying z by randomly selecting at least one value of $r \in \mathbb{Z}[\sqrt{2}]$ such that the norm equation is solvable for z replaced by rz.

5. The method of claim 4, wherein a single-qubit matrix defined by z and r is of the form $$\frac{1}{\sqrt{2}^L}\begin{pmatrix} rz & y \\ -y^* & r^*z^* \end{pmatrix}$$

and the norm equation is $|y|^2 = 2^L - |rz|^2$, wherein L is a positive integer.

6. The method of claim 5, wherein at least one value of r is selected so as to boost the one-round probability of success $p(r)=|rz|^2/2^L$ of the RUS circuit.

7. The method of claim 6, wherein the probability of success is proportional to a square of a magnitude of the product of r and z.

8. The method of claim 5, further comprising defining the multi-qubit unitary based on the single-qubit matrix.

9. The method of claim 8, further comprising expanding the single-qubit matrix corresponding to the target single-qubit unitary into a multi-qubit unitary, defining the multi-qubit unitary as a Clifford+T unitary by identifying the entangling two-qubit gates required for implementation of the RUS circuit.

10. The method of claim 9, further comprising decomposing the single-qubit matrix corresponding to the target single-qubit unitary into a product of axial rotations and implementing the multi-qubit unitary corresponding to each axial rotation as a Clifford+T circuit obtained from a product $g_3 c' g_4$, wherein $g_1, g_2, g_3, g_4$ are Clifford gates, c is a T-code, and c' is a decoration of c, and defining the two-qubit unitary as $\Lambda(g_5)(Id \otimes g_1) Lift(c')(Id \otimes g_2) \Lambda(g_6)$.

11. The method of claim 10, wherein the ancillary qubit or a plurality of qubits associated with the axial rotations are reused for the implementation of at least one additional RUS circuit.

12. The method of claim 9, further comprising decomposing the single-qubit matrix corresponding to the target single-qubit unitary, wherein the target single-qubit unitary performs a rotation around an axis in the x-y plane;
implementing the multi-qubit unitary corresponding to the rotation around an axis in the x-y plane with a circuit obtained from a controlled routing operation, wherein the controlled routing operation directs an input state to a unitary operation implementing either U or $U^\dagger$ and prepares one out of two possible EPR states on at least two ancillary qubits.

13. The method of claim 3, wherein the multi-qubit unitary is defined so as to be coupled to the ancillary qubits and the primary qubit, such that measurement of the ancillary qubits can be associated with success or failure of the multi-qubit circuit to produce a primary qubit state corresponding to the target single-qubit unitary.

14. The method of claim 13, further comprising defining a restoring circuit that returns the output state of the primary qubit to an input state of the primary qubit if the ancillary qubits indicate failure of the multi-qubit circuit.

15. The method of claim 1, further comprising receiving a rotation angle θ and the precision, and the cyclotomic approximation is associated with a phase factor $e^{i\theta}$.

16. The method of claim 15, wherein the cyclotomic rational is selected such that $|z^*/z - e^{i\theta}| < \varepsilon$, wherein ε is the precision and $z^*/z$ is the cyclotomic rational.

17. The method of claim 15, wherein the RUS circuit includes at least one ancillary qubit and a primary qubit coupled to a plurality of gates such that production of a first output state of the at least one ancillary qubit is associated with an output state of the primary qubit that is associated with the rotation angle θ.

18. The method of claim 17, wherein a second output state of the at least one ancillary qubit is associated with an output state of the primary qubit that is not associated with the rotation angle θ.

19. The method of claim 18, wherein the RUS circuit includes a restoring circuit situated to be applied to the primary qubit if the ancillary qubits are measured to be in the second state.

20. A compiler for defining a quantum circuit, comprising:
a processor; and
at least one non-transitory computer-readable storage medium having computer-executable instructions for the method of claim 1.

* * * * *